(12) United States Patent
Busch et al.

(10) Patent No.: US 8,390,155 B2
(45) Date of Patent: Mar. 5, 2013

(54) COIL FORMER FOR A LINEAR MOTOR STATOR FOR AN AUTOMATIC DOOR

(75) Inventors: Sven Busch, Dortmund (DE); Thomas Schüler, Wetter (DE)

(73) Assignee: Dorma GmbH + Co. KG, Ennepetal (DE)

( * ) Notice: Subject to any disclaimer, the term of this patent is extended or adjusted under 35 U.S.C. 154(b) by 285 days.

(21) Appl. No.: 12/733,225

(22) PCT Filed: Jul. 18, 2008

(86) PCT No.: PCT/EP2008/005909
§ 371 (c)(1), (2), (4) Date: Feb. 16, 2010

(87) PCT Pub. No.: WO2009/021597
PCT Pub. Date: Feb. 19, 2009

(65) Prior Publication Data
US 2010/0156200 A1   Jun. 24, 2010

(30) Foreign Application Priority Data
Aug. 16, 2007   (DE) .......................... 10 2007 038 848

(51) Int. Cl.
*H02K 3/46* (2006.01)
*H02K 1/18* (2006.01)
*H01F 5/02* (2006.01)

(52) U.S. Cl. ..................................... 310/12.21; 310/194
(58) Field of Classification Search ............... 310/12.21, 310/194, 215
See application file for complete search history.

(56) References Cited

U.S. PATENT DOCUMENTS

| | | | | |
|---|---|---|---|---|
| 6,566,779 | B2 * | 5/2003 | Takano et al. | 310/214 |
| 6,789,305 | B2 * | 9/2004 | Seki et al. | 29/596 |
| 6,941,644 | B2 * | 9/2005 | Shteynberg et al. | 29/605 |
| 6,975,056 | B2 * | 12/2005 | Okada et al. | 310/194 |
| 7,200,917 | B2 * | 4/2007 | Takano et al. | 29/596 |
| 7,253,547 | B2 * | 8/2007 | Shin et al. | 310/194 |
| 7,812,496 | B2 * | 10/2010 | Sugiura et al. | 310/194 |
| 7,855,484 | B2 * | 12/2010 | Sasaki | 310/194 |

FOREIGN PATENT DOCUMENTS

| | | |
|---|---|---|
| DE | 40 16 948 | 11/1991 |
| DE | 196 18 518 | 3/1998 |
| WO | WO 94/13055 | 6/1994 |

* cited by examiner

*Primary Examiner* — Burton Mullins
(74) *Attorney, Agent, or Firm* — Cozen O'Connor (57) ABSTRACT

A coil former for a linear motor stator for an automatic door having a coil arrangement, which, upon appropriate activation, is able to produce an interaction with a linear motor rotor, which causes thrust forces, with a body for the reception of a winding wire to form a coil, and at least one flange terminating the body at the front side, wherein the at least one flange of the coil former has at least one wire reception, which is able to receive a predetermined length of the winding wire and is able to, at least partially, release it again.

18 Claims, 6 Drawing Sheets

COIL FORMER FOR A LINEAR MOTOR STATOR FOR AN AUTOMATIC DOOR

CROSS REFERENCE TO PRIOR APPLICATION

This is a U.S. national stage of application No. PCT/EP2008/005909, filed on Jul. 18, 2008. Priority is claimed on Germany, Application No.: 10 2007 038 848.0, filed: Aug. 16, 2007 the content of which is incorporated here by reference.

BACKGROUND OF THE INVENTION

1. Field of the Invention

The invention relates to a coil former for a linear motor stator for an automatic door, the linear motor stator having a coil arrangement, which, upon appropriate activation, is able to produce an interaction with a linear motor rotor, which causes thrust forces.

2. Description of the Related Art

Sliding doors with linear motors are known from the documents DE 40 16 948 A1, DE 196 18 518 C1 and WO 94/013055 A1. The basic arrangement of the shown linear motors suggests that they are individually manufactured in an expensive process and that a series production is not accessible or difficult to realize.

SUMMARY OF THE INVENTION

It is an object of the present invention to develop a linear motor or parts thereof for an automatic door such that the linear motor is easier to manufacture, wherein this should be accomplished in particular through automation of at least some parts of the production.

The inventive coil former for a linear motor stator for an automatic door has a body for the reception of a winding wire to form a coil and at least one flange terminating the body at a front side, wherein the linear motor stator has a coil arrangement, which upon appropriate activation, is able to produce an interaction with a linear motor rotor, which causes thrust forces. The inventive coil former is characterized in that at least one flange of the coil former has at least one wire reception, adapted to receive a predetermined length of the winding wire and to at least partially release it again.

This inventive configuration provides that the coils to be installed in a coil strand of the linear motor stator in a first arrangement, namely a coiling arrangement, can be coiled in an uninterrupted process by an automatic winding machine and thereupon be brought to the manufacturing site of the linear motor stator in a second arrangement, namely an equipping arrangement, without severing the winding wire. This means that the collectively wound coils are already linearly connected to each other and that, there are no connection points between the individual coils of such a coil strand. Thereby, in addition to allowing for automated winding of the coils of one coil strand, a higher reliability is guaranteed.

Thus, according to the invention, the at least one wire reception is preferably provided to receive the winding wire before and after coiling the body, and, after having terminated a collective consecutive uninterrupted coiling of several coil formers disposed next to each other in a coiling arrangement, to at least partially release it again such that a predetermined free wire length is given between wound coil formers, which length results from the released portion of the winding wire received by the wire reception and a portion of winding wire, which remains between two coil formers when being coiled consecutively onto them, such that the several collectively wound coil formers can be brought to the manufacturing site of the linear motor stator to an equipping arrangement which is different from the coiling arrangement, without having to sever the winding wire.

In this case, the predetermined free wire length is preferably dimensioned such that several, in particular three coil arrangements, which each have one uninterrupted winding wire, can be disposed in the linear motor stator in an interlaced manner. This means that between two individual coils of such a coil arrangement respectively one or several coils of one or several other coil arrangements are disposed. Due to the inventive configuration of the coil former, during the coiling process, it is not only possible for the individual coils of one coil arrangement to be oriented in a different way as during the assembly process, i.e. like in the completed linear motor stator, without severing the winding wire, but also to provide such a free wire length between the individual coils, that means wound coil formers, which length allows the individual coils of a coil arrangement not to be located directly next to each other, but next to coils of different coil arrangements of the linear motor stator. On account of consecutive activation of the different coil arrangements, an interaction is then produced with a linear motor rotor, which causes thrust forces.

According to one embodiment of the invention, the wire reception of the coil former has preferably at least one holding device that is able to release at least one portion of the winding wire received by the wire reception without having to overcome a release resistance. Due to such a holding device, the winding wire can be received during the automated coiling process and, once the coiling process of the coil arrangement is terminated, it can be readily released again in a straightforward manner.

The holding device preferably has at least one nose protruding beyond the flange, which is provided with at least one holding device, along or around which nose the winding wire can be guided. This is a particularly simple possible configuration of the inventive wire reception, which allows for an automated coiling of several coil formers disposed next to each other and complies with the requirement to be able to release the winding wire after terminating the coiling process without having to overcome a release resistance.

Preferably, the at least one nose has a guiding area, along or around which the winding wire can be guided, and a support area, which can absorb a force acting on the nose and originating from the guiding area. This configuration allows in a particularly simple and material-saving configuration to guarantee the strength of the nose such that the nose can absorb the forces, which act on the latter during the coiling process, during the removal from an automatic winding machine and during subsequent equipping of a linear motor stator, without being destroyed, for example sheared off.

As an alternative or in addition to such a nose, the holding device according to the invention may preferably have a groove, along which the winding wire can be guided. Hereby again an automated winding as well as a release of the winding wire is possible without having to overcome a release resistance, once the coiling process is terminated.

In the inventive coil former, the wire reception preferably has a reception guide, which is disposed on the entry side, in order to facilitate guiding of the winding wire within the wire reception. In this case, the disposition on the entry side particularly means that, during the winding process, the winding wire at first enters the reception guide prior to continue within the wire reception. Such a reception guide disposed on the entry side makes the winding wire enter in each case the wire reception after terminating the winding process of the body, even in case of existing manufacturing tolerances.

Preferably, the reception guide consists of a recess of the at least one flange, whereby the flange has a surface with reduced material thickness, which represents a particularly simple configuration to form the reception guide by making the flange thinner, the winding wire being guided along an edge generated between the thinner area and the normal thickness of the flange. This configuration contributes to material saving in a simple manner.

The recess of the at least one flange, by which the flange has a surface with reduced material thickness, preferably achieves a direct and linear guidance from an entry side of the wire reception to the holding device. On account of this configuration, a particularly simple automated coiling is made possible.

The inventive coil former preferably has a clamping device, which is disposed at the at least one flange, which flange has at least one wire reception to define one end of the coil and to not to release a winding wire received therein or to not to release it without having to overcome a release resistance. By means of such a clamping device, according to one embodiment of the invention, it is preferably guaranteed that, once the winding process of the coil arrangement is terminated, when at least partially releasing the winding wire received by the wire reception, the coil wound onto the body does not readily unwind again.

It is furthermore preferred that a direction, in which the winding wire is guided by the clamping device, is parallel to a direction in which the body is coiled. In this preferred embodiment, the clamping device, with its exit side, adjoins the entry side of the wire reception. After coiling the body, the winding wire enters the wire reception through the clamping device. A defined number of windings of the coil wound onto the body is hereby guaranteed, which number does not change once the winding is completed, because the end of the coil winding is held by the clamping device, and thus is not uncoiled during the release of the winding wire located within the wire reception. Furthermore, the parallel guidance of the winding wire in the clamping device with regard to the coiling direction of the body guarantees that a particularly simple coiling of the coil former can be carried out by an automatic winding machine.

Preferably, the clamping device consists of a wire guide and two barbs, whereby a winding wire can be inserted, with little or no resistance at all, past the barbs into the wire guide and it can not be removed from the wire guide or only be removed against the release resistance, against the action of the barbs. This configuration allows for an automated introduction of the winding wire into the wire guide and guarantees that the winding wire introduced into the wire guide can not be removed from the wire guide, for example in case of manually equipping the linear motor stator, thus allowing to keep the defined length of the wound coil.

It is furthermore preferred that the wire guide has a rounding on the exit side, along which a winding wire coming out of the clamping device is guided. This configuration prevents the winding wire from kinking, when winding the coil former and also when equipping the linear motor stator.

Preferably, the inventive coil former has a wire feed assistance, which is disposed at least at one flange, which has a wire reception, in order to define a start of the coil. Due to such a wire feed assistance, the winding wire, which is introduced into the wire reception of a coil former or with which the winding process of a coil arrangement has been started, is reliably introduced into the following, respectively the first coil former such that the coil start is defined and the winding wire is guided onto the body. All the above, in conjunction with the definition of the coil end, makes sure that the wound coil has a predetermined number of windings.

Preferably, in the inventive coil former, the at least one flange, which has a wire reception, is configured rotationally symmetric with regard to a winding axis of the coil former such that altogether two wire receptions are provided thereat. This allows for a particularly simple equipping of the automatic winding machine, in particular, if the at least one flange and/or the body have a rectangular shape, because in this case, during the equipping process, the orientation of the coil former requires less attention.

In the inventive coil former, the body and the at least one flange terminating the body on the front side, preferably have a break-through for a coil core, whereby several coil formers can be fixed on one winding mandrel for a collective consecutive coiling, which mandrel is passed through their break-throughs. This allows for fixing all coil formers of at least one coil strand on one winding mandrel guided through their break-throughs and for a collective coiling without having to sever the winding wire. On account of configuring the break-through in such a manner that the reception of both a coil core and the winding mandrel is possible, the equipping of the automatic winding machine with coil formers to be coiled can be done in a particularly simple way, because the relatively large break-through of the body, provided for the coil core, likewise serves for the reception and orientation of the coil former in the winding machine.

Preferably, the at least one flange of the inventive coil former has a guiding device, abutting coil cores, which are located directly next to each other, the coil cores' corresponding flanges being located in one plane, and aligned with each other in a defined manner. Due to this inventive preferred feature, inventive coil formers, located within the equipping arrangement, are aligned with each other in a defined manner without having to necessarily perform an additional alignment of the individual coils located on the coil formers of one or several coil strands.

Preferably, the at least one guiding device has a cut-out configured in the at least one flange, into which a projection of a directly adjacent coil former in an equipping arrangement is able to engage. Considering material saving aspects, a guiding device can be formed in a simple way.

It is furthermore preferred that the projection is formed by the holding device. In this way an element, used during the automated coiling process for defining the free wire length, can serve for aligning the coil formers in the equipping arrangement and thus fulfil two functions.

The inventive coil former for a linear motor stator for an automatic door is used, according to the invention, preferably for driving at least one door leaf of a sliding door, which is preferably configured as an arched sliding door or as a horizontal sliding wall. In addition to this application, it may be used for building a linear motor stator for driving gate leaves or in feeding devices, handling equipment or transport systems.

BRIEF DESCRIPTION OF THE DRAWINGS

The invention will now be described in more detail, reference being made to the embodiments, in which:

FIG. 5b is an elevation view of the coil former shown in FIG. 5a;

DETAILED DESCRIPTION OF THE PREFERRED EMBODIMENTS

Figure 1A:
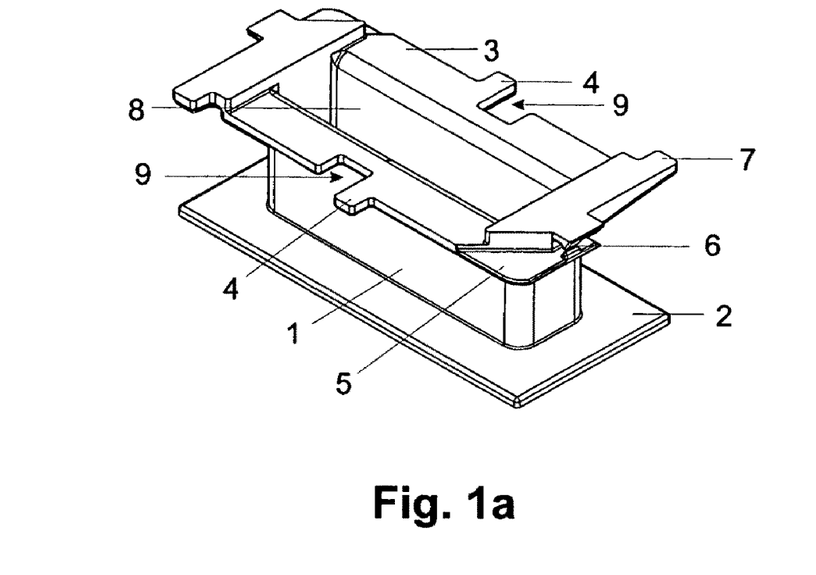
FIG. 1a is a perspective view of a first embodiment of an inventive coil former from above.

FIG. 1a is a first embodiment of an inventive coil former for a linear motor stator for an automatic door in a perspective view from above, i.e. with an illustration of the exterior side of the one flange 3 of the coil former, which in this case has two wire receptions 4, 5, which receive a predetermined length of a winding wire and are able to release it again at least partially. In this embodiment, the inventive coil former has an essentially cuboid body 1 for receiving the winding wire on its exterior side and has two flanges 2, 3 terminating the body 1 on the front sides. In an elevation view, the cross-section of the flanges 2, 3 has an essentially rectangular basic shape, which projects beyond the front sides of the cuboid body 1. A break-through 8 extends through the body 1 and through the flanges 2, 3, terminating the front side of the body, for the reception of a coil core in an installed linear motor stator, respectively for the attachment of the coil former on a winding mandrel during the coiling process.

In the illustrated first embodiment, one of the flanges 2, 3, terminating the body 1 on the front side, namely the flange 3 shown at the top of FIG. 1a, has a first wire reception 4, 5, in order to receive the winding wire after the coiling process of the body 1 and prior to the coiling process of a following coil former. In this embodiment, the flange 3, provided with the first wire reception 4, 5, has a second wire reception 4, 5 which, with regard to a winding axis defined by the break-through 8, is offset by 180° with regard to the first wire reception 4, 5. If needed, the second wire reception 4, 5 may serve as the reception of a predetermined length of the winding wire prior to the coiling process of the body 1. In alternative configurations, the flange 3, provided with the wire receptions 4, 5, may have one or more than two wire receptions. Furthermore, the flange 2, which in this embodiment is not provided with a wire reception, may also have one or several wire receptions, in order to allow for an even simpler equipment of the automatic winding machine and/or for the reception of longer wire lengths of the winding wire.

Each wire reception 4, 5, in the shown embodiment of the inventive coil former, consists of a holding device 4 and of a reception guide 5. The reception guide 5 achieves that the winding wire, entering the wire reception 4, 5, actually enters the latter and does not continue to be wound onto the body 1. In the illustrated embodiment, the reception guide 5 consists of a slanted surface, by which the flange 3 tapers. Due to the slanted surface, one corner of the flange 3 is flattened to a triangular shape such that the winding wire, entering wire reception 4, 5, is more readily guided away from the body 1 to the exterior onto the flange 3. In this embodiment, the holding device of the wire reception 4 consists of a nose of the wire reception 4, protruding beyond the flange 3, around which the winding wire is placed after the coiling process of the body 1 and after being guided through the reception guide 5.

Situated in front of the reception guide 5 in terms of the technical winding, a clamping device 6, through which the winding wire runs prior to being received by the reception guide 5, is provided, incorporated into the flange 3. The clamping device 6 does not release the winding wire received therein during the winding process, nor does it release it without overcoming a release resistance. This serves to secure the coil end of the coil wound onto the body 1, after removing the completely wound coil arrangement from the automatic winding machine during the equipment of the linear motor stator, when the winding wire is removed from the wire reception 4, 5.

In this embodiment, the inventive coil former furthermore has a wire feed assistance 7, in the shape of a nose protruding beyond the flange 3 and of an inclination, which is incorporated into the nose and defines a starting position of the coil, wound onto the body 1. The winding wire, entering the first coil of a coil arrangement, is guided at a defined position along the wire feed assistance towards the body 1 and is then wound onto the body 1 with a predetermined number of windings, until being received by means of the clamping device 6 in such a way by the wire reception 4, 5, that at first it passes a guide of the reception 5 and is subsequently received by the holding device of the wire reception 4, in this case by the nose of the wire reception 4 protruding beyond the flange 3. Subsequently, the winding wire, again in a defined position, is guided along the wire feed assistance 7 of the next coil former in order to be coiled onto the body 1 thereof. This process is continued until all coil formers of the coil arrangement are wound.

In this embodiment, the inventive coil former has a guiding device 9 in the shape of a recess provided in the flange 3, into which the nose of the wire reception 4 of the holding device of an adjacent coil former can engage such that the adjacent coil formers are aligned with each other in a defined manner.

In the embodiment shown not only the wire receptions 4, 5, but also the clamping device 6, the wire feed assistance 7 and the guiding device 9 are correspondingly configured twice in the flange 3.

Figure 1B:
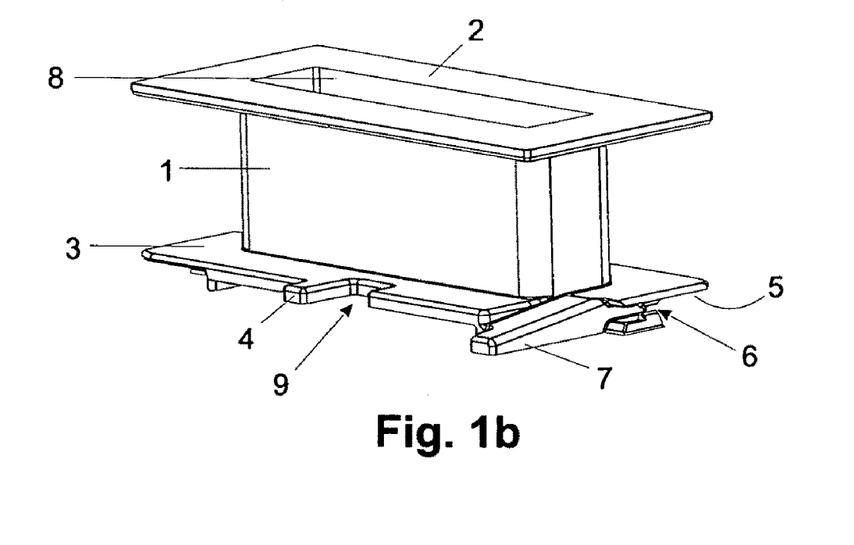
FIG. 1b is a perspective view of the coil former shown in FIG. 1a from below.

FIG. 1b shows the coil former, of FIG. 1a from below, i.e. in a view onto the exterior side of the flange 2, which is not provided with the wire receptions 4, 5 and terminates the body 1 on the front sides. It can be seen, that the break-through 8 likewise extends through this flange 2.

Figure 2:
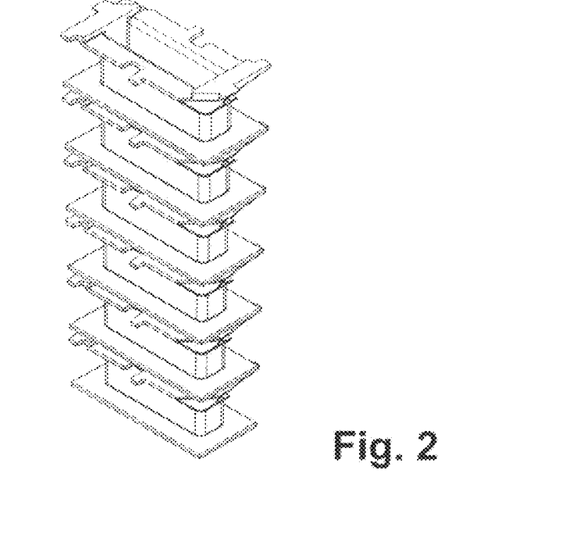
FIG. 2 is seven of the coil formers shown in FIG. 1 in a coiling arrangement.

FIG. 2 shows seven inventive coil formers in a coiling arrangement according to the first embodiment shown in FIG. 1, i.e. stacked on top of each other in such a way that, with their break-throughs 8, they can be fitted onto a winding mandrel, the respective flange 3 of a coil former, provided with two wire receptions resting upon a flange 2 of an adjacent coil former, which flange is not provided with the wire receptions 4, 5.

Figure 3:
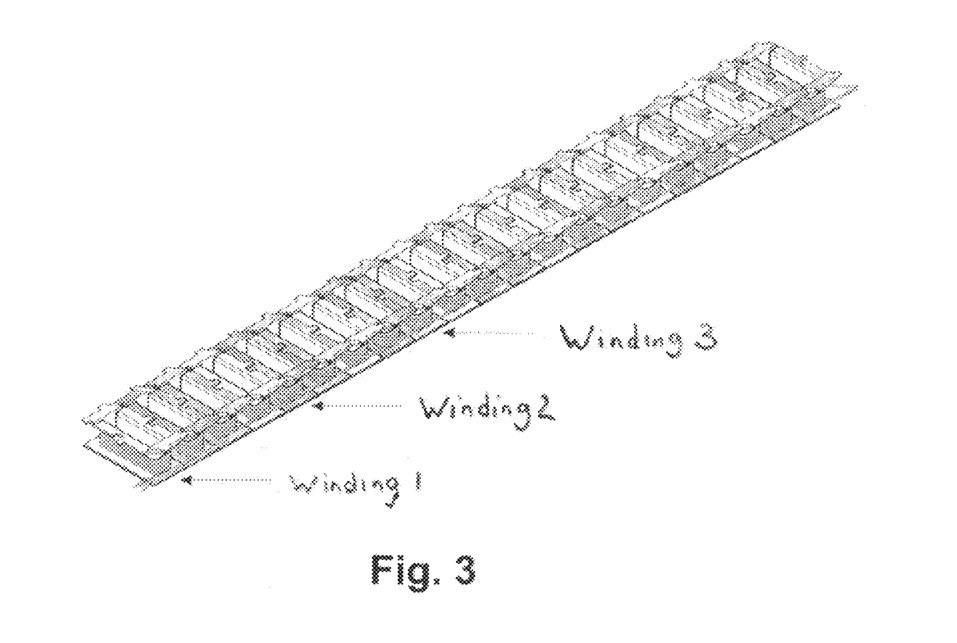
FIG. 3 is three coil strands with seven respectively coil formers in an equipping arrangement.

FIG. 3 shows three coil strands, consisting respectively of seven wound coil formers, in an arrangement, with flanges 3 located in one plane and abutting each other and being provided with respective wire receptions 4, 5, in which the nose 4 of the holding device respectively engages in the guiding device 9 of an adjacent coil former. Non-hatched coil formers, respectively coil formers having the same hatching belong to one coil strand and, during the winding process, had been arranged according to FIG. 2.

Figure 4A:
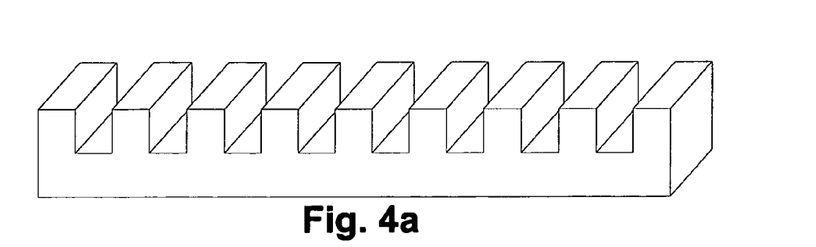
FIGS. 4a to 4e are configurations of magnetic keepers, on which the inventive coil formers are disposed in the equipping arrangement.
Figure 4B:
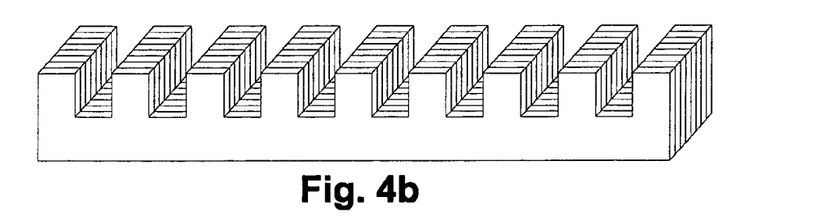
Figure 4C:
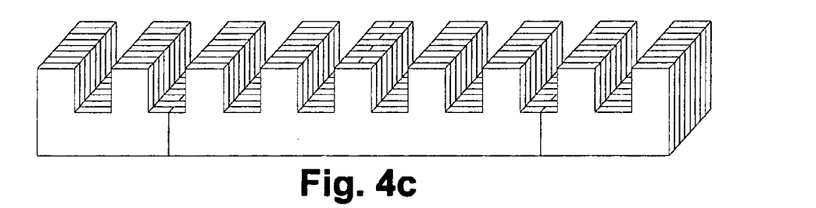
Figure 4D:
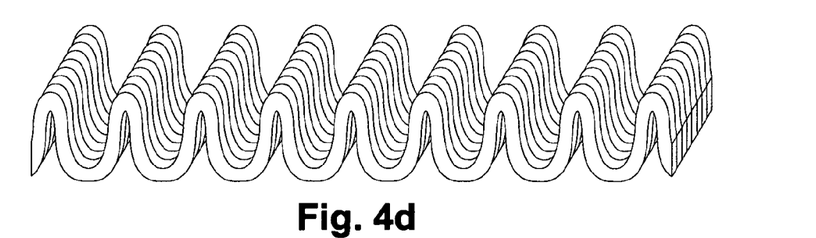
Figure 4E:
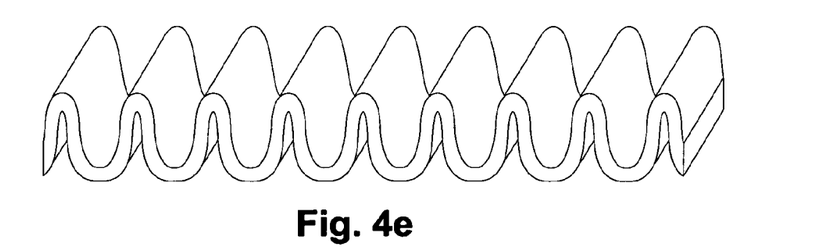

FIGS. 4a to 4e are several configurations of magnetizable keepers, on which the inventive coil formers are disposed in the equipping or equipment arrangement. FIG. 4a is a configuration made from solid material. FIG. 4b is a laminated configuration, in which the keeper consists of one laminated stack of the same individual laminations. FIG. 4c shows a laminated keeper, in which individual laminations are used, which are offset with regard to each other, wherein the individual lamination layers, stacked on top of each other, alternatingly consist of two or three individual laminations. FIG. 4d is a keeper consisting of bent wires. The keeper shown in FIG. 4d may be formed likewise as one-piece as shown in FIG. 4e or multiple pieces as shown in FIG. 4c.

During manufacturing, the keepers are equipped with the wound coil formers and subsequently they are placed into a casting trough, before filling the casting trough with a synthetic resin.

Figure 5A:
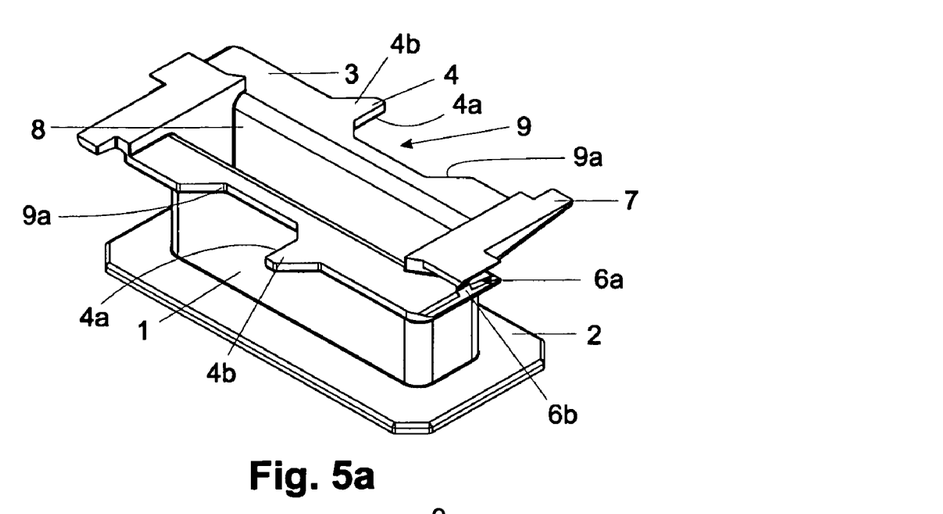
FIG. 5a is a perspective view of a second embodiment of an inventive coil former from above.
Figure 5B:
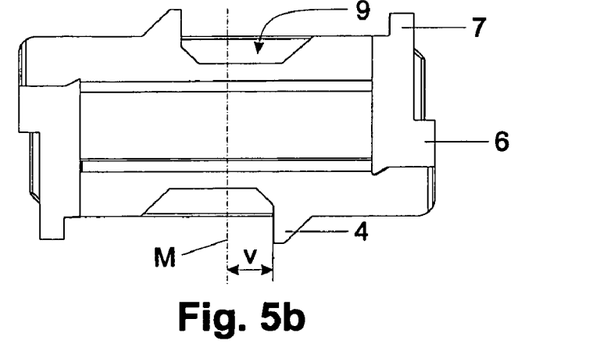
Figure 5C:
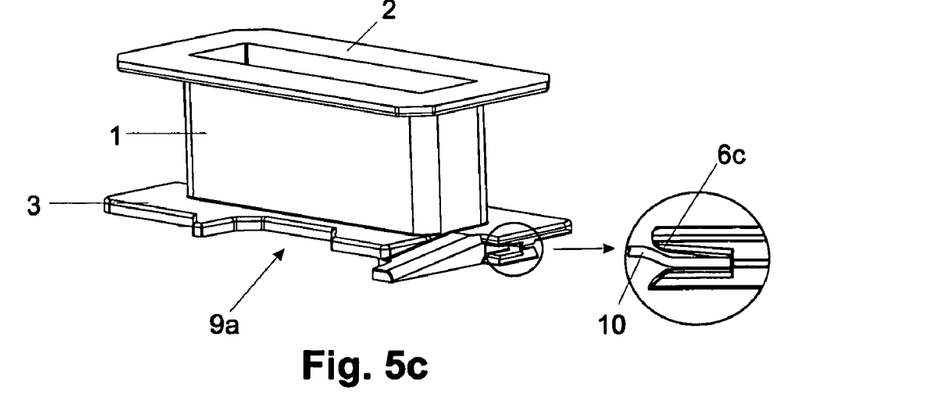
FIG. 5c is a perspective view of the coil former shown in FIG. 5a from below.

FIGS. 5a to 5c show a second embodiment of an inventive coil former. In this case, FIG. 5a shows a perspective view of the coil former from above and FIG. 5c is a perspective view of the coil former shown in FIG. 5a from below. Unlike the coil former shown in FIG. 1, here the nose 4 has a support area 4b, which is disposed with regard to a guiding area 4a, along which the winding wire is guided, on the rear side of the nose 4, and gives the nose 4 a better protection against shearing-off during the winding process or against other similar loads. Essentially, the support area 4b is an enlargement of the nose 4, which, at the bottom of the nose 4 by which the nose 4 is connected to the flange 3, is reinforced and configured tapering towards the tip of the nose 4.

FIG. 5b is a top elevation view of the coil former shown in FIG. 5a, in which an offset v of the nose 4, more precisely of the guiding area 4a of the nose 4, with regard to a vertical centre line M is drawn in, the free wire length between two individual coils being defined by offset v.

The guiding device, consisting of a recess 9, is adapted to the shape and position of the nose 4, i.e. has a locating edge 9a adapted to the support area 4b, against which the support area of an adjacent coil former in the equipping arrangement bears, and which aligns the two adjacent coil formers with each other.

Furthermore, the clamping device is illustrated in detail in the FIGS. 5a and 5c. In particular a wire guide 6a of the clamping device 6 can be seen, into which the winding wire 10 is introduced. The introduction is done by preferably passing through between two barbs 6b of the clamping device 6, which provides a simple introduction without much resistance. Instead of two barbs 6b, likewise only one barb 6b can be provided. An opposite side, at which usually the second barb 6b would be found, is configured essentially flat. With such barb arrangements, a removal of the winding wire 10 from the wire guide 6a cannot be done or can only be done while overcoming a release resistance. The release resistance is generated on account of a distance of the one barb 6b to its opposite side, respectively of the two opposite barbs 6b to each other, which distance is smaller when being compared to the exterior diameter of the winding wire 10. On the exit side, the clamping device is provided with a rounding 6c to prevent the winding wire from accidentally being bent during the winding process.

As another difference to the first embodiment shown in FIG. 1, in the second embodiment of the inventive coil former, the reception guide 5 for the wire reception is not provided, in order to not to weaken the flange 3 in this area.

Figure 6A:
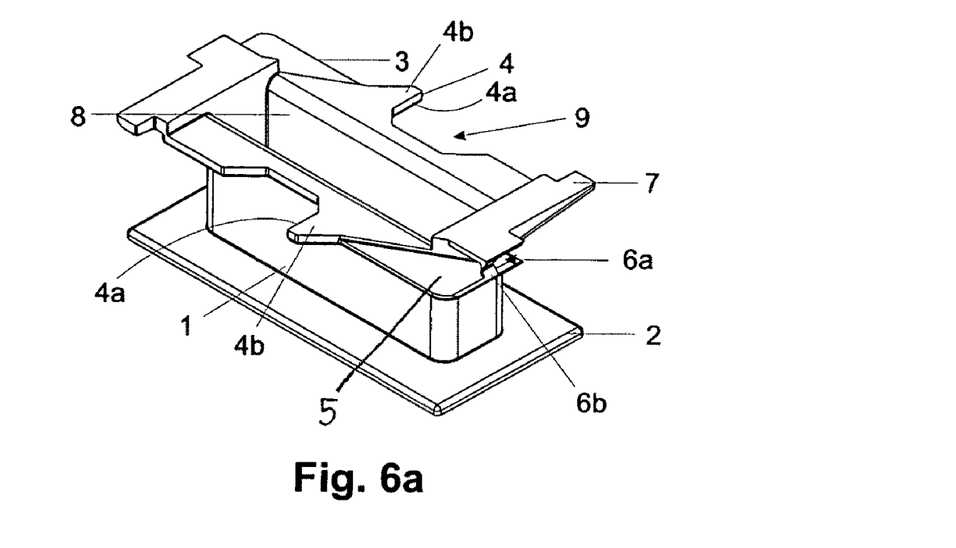
FIG. 6a is a perspective view of a third embodiment of an inventive coil former from above.
Figure 6B:
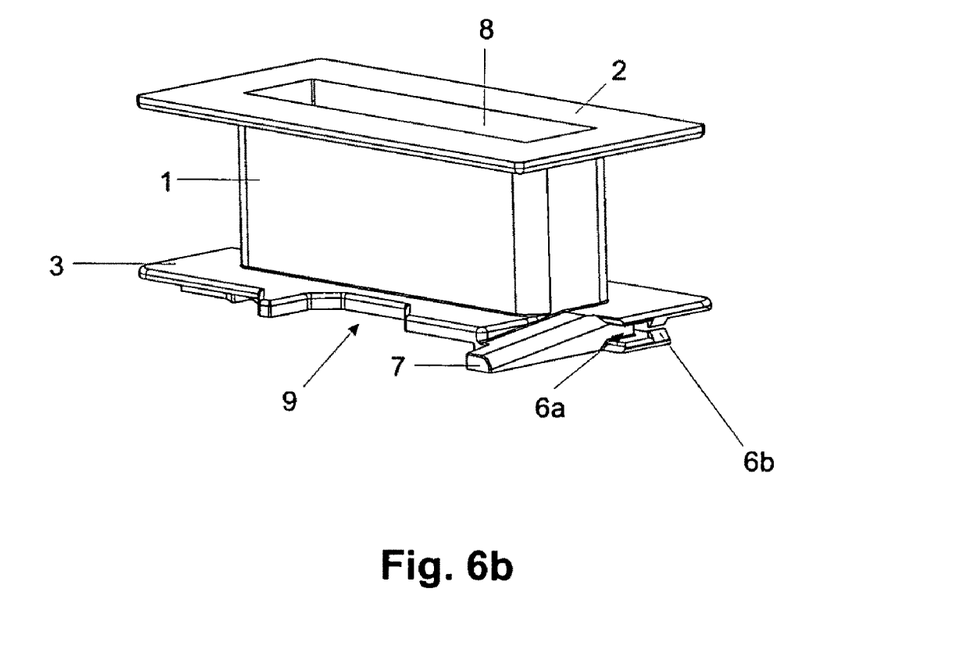
FIG. 6b is a perspective view of the coil former shown in FIG. 6a from below.

FIG. 6a is a perspective view of a third embodiment of the inventive coil former from above and FIG. 6b is a perspective view of the coil former shown in FIG. 6a from below. Unlike the second embodiment shown in FIG. 5, the reception guide 5 of the wire guide is not omitted, but enlarged and rectilinearly extending from the exit of the clamping device 6 to the nose 4 such that a winding wire, exiting the clamping device, is directly guided to the holding device of the wire reception, namely the nose 4.

Figure 7A:
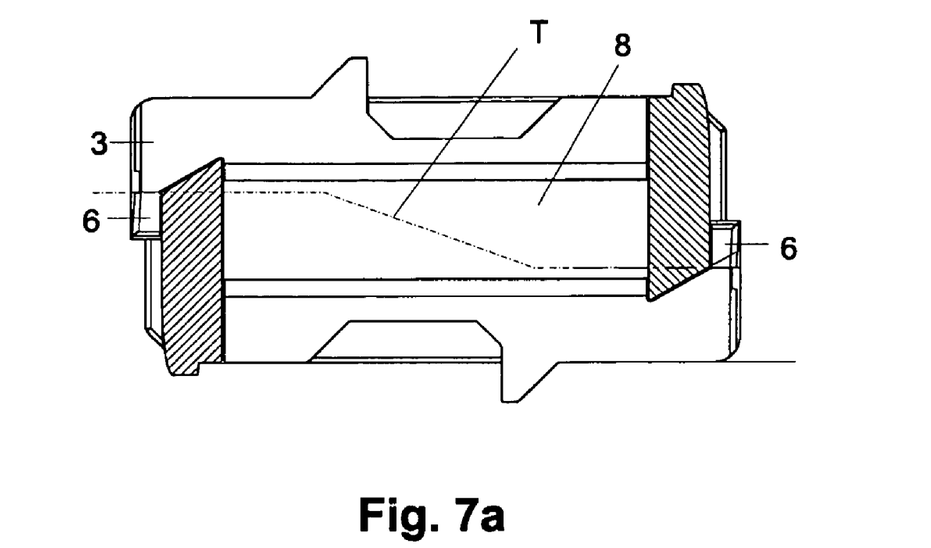
FIG. 7a is an elevation view of the coil former shown in FIG. 5a including the marked tool separation.
Figure 7B:
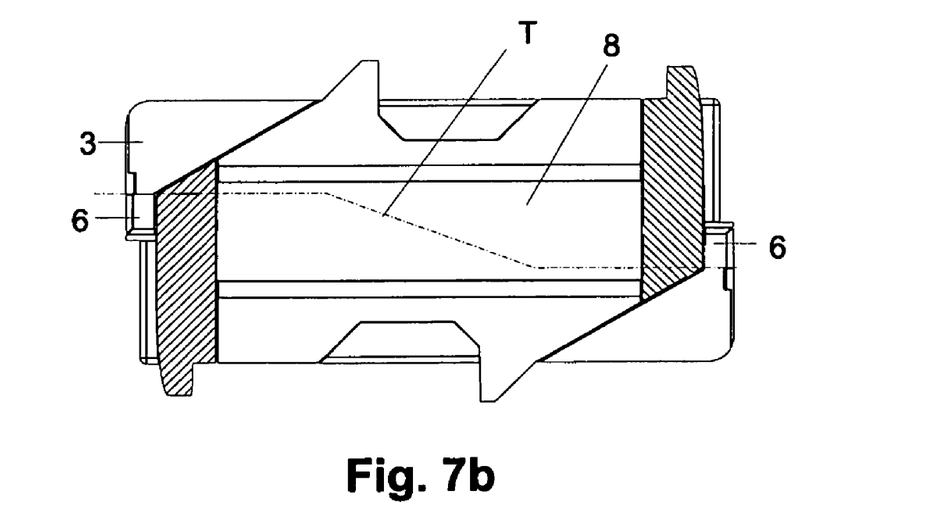
FIG. 7b is an elevation view of the coil former shown in FIG. 6a including the marked tool separation.

FIG. 7a is an elevation view of the coil former shown in FIG. 5a with a marked tool separation. FIG. 7b is an elevation view of the coil former shown in FIG. 6a with the marked tool separation. These tool separations T designate the separation line between two parts of an injection mould, by which the respective coil former is manufactured. The shape of the respective coil former and the separation line are chosen such as to be able to utilize a bipartite injection mould, except for the required tool to form the cavity for the reception of the keeper. So to speak one half of the injection mould can be moved frontally, i.e. in the drawings in vertical direction. For this purpose, the respective tool separation T extends for the major part across the respective break-through 8 and otherwise vertically through the side walls of the essentially cuboid body 1 and of the essentially rectangular flanges 2, 3, which are provided with the clamping devices 6, wherein the tool separation T intersects these side walls respectively in the area of the clamping devices 6. The thereby created offset with regard to a horizontal centre line is compensated for by a diagonally connection in the area of the break-through 8.

This type of tool separation T represents a cost advantage, on the one hand in the utilization of only two halves, and on the other hand in that machines, which are able to bring the injection moulds close to the machine and to move them away under different angles, are very expensive.

The inventive coil former allows thus for automated coiling with a winding wire, for example enamelled copper wire, for manufacturing a coil strand, wherein a wire feed assistance 7 in the shape of a projection with a feed inclination is provided at the coil former. Furthermore, the inventive coil former has preferably a clamping device 6 in order to fix the last wire winding. For achieving the correct wire length between the coils, a wire reception 4, 5 is provided, and a break-through 8 is provided at the interior side of the coil former for the reception and fixing of core laminations of a magnetic keeper. Due to the configuration of the flanges 2, 3 terminating the body 1 at the front sides and protruding beyond the body 1 and likewise beyond the terminated wound coils, an electrical insulation of the winding from the core laminations is achieved, which laminations preferably form the magnetizable keeper.

The inventive coil former is preferably manufactured as a injection moulding part, a plastic material having good injection moulding features is used, for example natural PA6-30H. The material should be continuously heat resistant up to 130° C. and flame resistant.

For example respectively seven coil formers are combined into one coil strand. For this purpose, the coil formers are fixed one on top of the other on a winding mandrel, as shown in FIG. 2, and are automatically coiled in a single operational step. The wire is guided via the introduction inclination of the wire feed assistance 7 towards the bottom of the coil former, i.e. the exterior side of the body 1, and the last winding of each individual coil automatically engages in the clamping device 6 at the edge of the coil former, i.e. on the flange 3 provided with the wire reception 4, 5, and is thereby fixed. Upon transition from one individual coil to the next one, a free wire length, of for example 35 mm is realized, in order to be able to subsequently dispose the coil in a predetermined pattern, with interlaced individual coils of the coil strands. For this purpose, the wire reception 4, 5 is mounted in the shape of a protuberance or nose at the flange 3 provided with the wire reception 4, 5.

As an alternative to this nose, likewise a cut-out or groove can be provided.

The wire length received by the wire reception is preferably measured such that respectively two more individual coils can be mounted between adjacent coils of a coil strand, such as illustrated in FIG. 3.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A coil former for a linear motor stator for an automatic door, comprising:
   a coil arrangement, which, upon appropriate activation, produces an interaction with a linear motor rotor to cause thrust forces, each coil of the coil arrangement comprising:
   a body configured to receive a winding wire to form a coil; and
   at least one flange terminating the body at a front side, the at least one flange having at least one wire receiver configured to releaseably receive a predetermined length of the winding wire, wherein the wire receiver has at least one holding device that comprises at least one projection that protrudes beyond the flange configured to guide the winding wire and is configured to release at least one portion of the winding wire received by the wire receiver, without having to overcome a release resistance.

2. The coil former according to claim 1, wherein the at least one projection comprises a guide area for the winding wire to be at least one of guided along and guided around, and a support area that absorbs a force originating from the guiding area acting on the projection.

3. The coil former according to claim 2, wherein the holding device comprises at least one groove configured to guide the winding wire.

4. The coil former according to claim 1, wherein the wire receiver has a reception guide disposed on an entry side configured to guide the winding wire in the wire receiver.

5. The coil former according to claim 4, wherein the reception guide comprises a recess in the at least one flange, whereby the flange has a surface with reduced material thickness.

6. The coil former according to claim 5, wherein the recess of the at least one flange is arranged to provide a direct rectilinear guide from an entry side of the wire reception to the holding device.

7. The coil former according to claim 1, further comprising a clamping device arranged at the at least one flange, the at least one flange comprising the wire receiver, the clamping device configured to define one end of the coil and to clamp the winding wire with a holding force.

8. The coil former according to claim 1, further comprising a wire feed assistant arranged at the at least one flange that defines a start of the coil.

9. The coil former according to claim 1, wherein the at least one flange is configured rotationally symmetric with regard to a winding axis of the coil former such that two wire receivers are provided thereon.

10. The coil former according to claim 1, wherein the body and the at least one flange terminating the body comprises a break-through for a coil core, whereby, for a collective consecutive coiling, several coil formers can be fixed on a winding mandrel passed through their respective break-throughs.

11. The coil former according to claim 1, wherein the at least one flange has at least one guiding device, whereby in an equipment arrangement directly adjacent coil formers, abutting each other are aligned with each other in a defined manner, their corresponding flanges located in one plane.

12. The coil former according to claim 11, wherein the at least one guiding device comprises a cut-out in the at least one flange into which a projection of a directly adjacent coil former in an equipping arrangement is able to engage.

13. The coil former according to claim 12, wherein the projection is formed by the holding device.

14. A method for winding coil formers for a linear motor stator for an automatic door, the stator comprising a plurality of consecutive uninterrupted coiled coil formers disposed next to each other in a coiling arrangement, each having at least one wire receiver, wherein the wire receiver has at least one holding device that comprises at least one projection that protrudes beyond a flange configured to guide the winding wire and is configured to release at least one portion of the winding wire received by the wire receiver, without having to overcome a release resistance, the method comprising
   receiving, at the at least one wire receiver of a respective coil former, the winding wire at least one of before and after the coiling process of the body of the respective coil former; and
   releasing the winding wire from the at least one wire receiver after terminating the collective consecutive uninterrupted coiling of the several coil formers such that there is a predetermined wire length between the wound coil formers resulting from the released portion of the winding wire received in the wire receiver and from a portion of the winding wire that exists between two coil formers when they are consecutively wound;
   arranging the collectively wound coil formers for manufacturing the linear motor stator in an equipment arrangement without having to sever the winding wire, the equipment arrangement being different from the coiling arrangement.

15. A coil former for a linear motor stator for an automatic door, comprising:
   a coil arrangement, which, upon appropriate activation, produces an interaction with a linear motor rotor to cause thrust forces, each coil of the coil arrangement comprising:
   a body configured to receive a winding wire to form a coil; and
   at least one flange terminating the body at a front side, the at least one flange having at least one wire receiver configured to releaseably receive a predetermined length of the winding wire a clamping device arranged at the at least one flange, the at least one flange comprising the wire receiver, the clamping device configured to define one end of the coil and to clamp the winding wire with a holding force, wherein the wire receiver has at least one holding device configured to release at least one portion of the winding wire received by the wire receiver, without having to overcome a release resistance, wherein a direction that the winding wire is guided by the clamping device is parallel to a direction in which the body is coiled, and an exit side of the clamping device adjoins an entry side of the wire receiver.

16. The coil former according to claim 15, wherein the clamping device comprises a wire guide and at least one barb, wherein the wire guide and the at least one barb are configured such that the winding wire is introduced into the wire guide with little or no resistance at all while passing the at least one barb and is removable from the wire guide against a release resistance.

17. The coil former according to claim 16, wherein the clamping device comprises two barbs.

18. The coil former according to claim 16, wherein the wire guide has a rounding on the exit side, along which the winding wire is guided out of the clamping device.

* * * * *